(12) United States Patent
Yang et al.

(10) Patent No.: US 8,834,982 B2
(45) Date of Patent: Sep. 16, 2014

(54) CARBON NANORING AND METHOD FOR PREPARING THE SAME

(75) Inventors: Wensheng Yang, Beijing (CN); Jie Sun, Beijing (CN); Xu Chen, Beijing (CN); Haimei Liu, Beijing (CN)

(73) Assignee: Beijing University of Chemical Technology, Beijing (CN)

( * ) Notice: Subject to any disclaimer, the term of this patent is extended or adjusted under 35 U.S.C. 154(b) by 0 days.

(21) Appl. No.: 13/994,487

(22) PCT Filed: Dec. 7, 2011

(86) PCT No.: PCT/CN2011/083622
§ 371 (c)(1),
(2), (4) Date: Jun. 14, 2013

(87) PCT Pub. No.: WO2013/082770
PCT Pub. Date: Jun. 13, 2013

(65) Prior Publication Data
US 2013/0273294 A1    Oct. 17, 2013

(51) Int. Cl.
*B32B 3/02* (2006.01)
*C01B 31/02* (2006.01)
*B82Y 40/00* (2011.01)

(52) U.S. Cl.
CPC ......... *C01B 31/0293* (2013.01); *C01B 31/0206* (2013.01); *B82Y 40/00* (2013.01)
USPC ...................... 428/64.1; 423/445 R; 423/448

(58) Field of Classification Search
CPC ............................... B01J 21/185; B82Y 40/00
USPC ............................. 428/64.1; 423/445 R, 448
See application file for complete search history.

(56) References Cited

U.S. PATENT DOCUMENTS

| 7,718,155 B2 | 5/2010 | Zhang et al. |
| 7,887,771 B2 | 2/2011 | Sun et al. |

FOREIGN PATENT DOCUMENTS

| CN | 101282905 A | 10/2008 |
| CN | 101531362 A | 9/2009 |

(Continued)

OTHER PUBLICATIONS

Hyunkyung Chun et al., "Engineering Low-Aspect Ratio Carbon Nanostructures: Nanocups, Nanorings, and Nanocontainers", ACSNANO, May 2009, pp. 1274-1278, vol. 3, No. 5.

(Continued)

*Primary Examiner* — Elizabeth Mulvaney
(74) *Attorney, Agent, or Firm* — Sughrue Mion, PLLC

(57) ABSTRACT

The invention relates to a carbon nanoring and a method for preparing the same. The carbon nanoring according to the present invention is composed of monolayered or multilayered coaxial carbon rings, wherein the carbon ring has a structure similar to that of a closed ring system formed by graphite sheet being rolled, and each of an axial dimension and a radial dimension of the carbon nanoring is nanoscale with the axial dimension being smaller than the radial dimension. The invention further provides a method for preparing the above carbon nanoring including calcinating in an inert atmosphere or a reducing atmosphere a layered double hydroxides obtained by intercalating a long-chain alkyl anion and a carbon source molecule, growing a carbon nanoring within a confined region between layers under the catalysis of the metal element in layers, and removing the metal and the metal oxide by dissolving in an acid to obtain the carbon nanoring. By using this method, the carbon nanoring can be effectively controlled in terms of the axial dimension, the radial dimension, and the number of layers of the carbon ring thereof. The carbon nanoring provided by the present invention has the nano-ring shaped structure and the excellent properties of carbon materials, as well as more edge carbons and dangling bonds, and thus it has broad application prospects in such field as nanodevices, energy storage and sensing.

15 Claims, 13 Drawing Sheets

(56) References Cited

FOREIGN PATENT DOCUMENTS

| | | |
|---|---|---|
| CN | 102491309 A | 6/2012 |
| JP | 2010-99800 A | 5/2010 |
| WO | 2010/105058 A1 | 9/2010 |

OTHER PUBLICATIONS

Jie Liu et al., "Fullerene 'crop circles'", Nature, Feb. 1997, pp. 780-781, vol. 385.

Xiaoming Sun et al., "Optical Properties of Ultrashort Semiconducting Single-Walled Carbon Nanotube Capsules Down to Sub-10 nm", J. Am. Chem. Soc., 2008, pp. 6551-6555, vol. 130.

International Search Report for PCT/CN2011-083622 dated Sep. 20, 2012.

CARBON NANORING AND METHOD FOR PREPARING THE SAME

CROSS REFERENCE TO RELATED APPLICATIONS

This application is a National Stage of International Application No. PCT/CN2011/083622 filed Dec. 7, 2011, the contents of which are incorporated herein by reference in their entirety.

Background

1. Technical Field

The invention relates to a carbon nanoring and a method for preparing the same, belonging to the field of carbon nanomaterial.

2. Related Art

Nanoring that is a novel nanomaterial can be used as one important structural unit in the nanodevice due to its novel structure, and further shows broad application prospects in the field of functional material because of its unique and excellent properties. Hitherto, there has been synthesized a variety of nanorings, for example, metal oxide nanoring, metal nanoring, nanoring of long-chain organic molecule, and the like; however, it has not been reported for the carbon nanoring, in particular, the carbon nanoring having a structure similar to that of a closed ring system formed by graphite sheet being rolled.

J. Liu et. al (J. Liu, H. Dai, J. H. Hafner, D. T. Colbert, R. E. Smalley, Fullerene'crop circles', Nature, 1997, 385: 780) synthesized a ring made of carbon nanotube during the preparation of the single-walled carbon nanotube by using a laser method, and this ring made of carbon nanotube is a ring formed by seamlessly connecting the carbon nanotubes in an end-to-end manner. This structure is totally different from the carbon nanoring having a structure similar to that of a closed ring system formed by graphite sheet being rolled according to the present invention, though it was referred to as the carbon nanoring in some lituratures.

X. Sun et. al (X. Sun, S. Zaric, D. Daranciang, K. Welsher, Y. Lu, X. Li, H. Dai, Optical properties of ultrashort semiconducting single-walled carbon nanotube capsules down to sub-10 nm, J. Am. Chem. Soc., 2008, 130: 6551) obtained carbon nanotubes with a length of 10 nm or less or even close to 1 nm by cutting the single-walled carbon nanotubes through the concentrated acid solution treatment, and separating in accordance with the different lengths of carbon nanotubes by using density gradient ultracentrifugation; however, such length is still larger than or close to the radial dimension of the single-walled carbon nanotubes, that is to say, the proportion of the axial dimension to the radial dimension being larger than or equal to 1, and thus such carbon nanotubes can be only called as ultrashort carbon nanotubes. Moreover, since the carbon nanotube may be significantly damaged in its structure due to the cutting of the carbon nanotube through the concentrated acid solution treatment, it is difficult to obtain ultrashort carbon nanotubes with an ordered edge structure.

H. Chun et. al (H. Chun, M. G. Hahm, Y. Homma, R. Meritz, K. Kuramochi, L. Menon, L. Ci, P. M. Ajayan, Y. J. Jung, Engineering Low-Aspect Ratio Carbon Nanostructures: Nanocups, Nanorings, and Nanocontainers, ACS Nano, 2009, 3: 1274) obtained carbon nanorings with a radial dimension of 80 nm and an axial dimension of a few tens of nanometers by preparing carbon nanocups through chemical vapor deposition method in which the anodic aluminum oxide having short nanochannels is used as the template, and then removing the bottom of the nanocups by thinning via ion sputtering. However, the multi-walled carbon nanotubes generally have their maximum diameter of about 30 nm, and it would be difficult for them to be stable when the diameter is larger than the above value; in addition, it can be seen from electron microscopic images with high-resolution provided by H. Chun et. al that such carbon nanorings do not have structural characteristics of the graphite sheet. Therefore, what was obtained as above is only a carbon film having the ring-shaped structure, which is different from the carbon nanoring having a structure similar to that of a closed ring system formed by graphite sheet being rolled according to the present invention.

SUMMARY

To solve the above technical problems, this invention aims to provide a carbon nanoring which is composed of carbon rings having a structure similar to that of a closed ring system formed by graphite sheet being rolled.

The present invention also aims to provide a method for preparing the above carbon nanoring.

In order to achieve the above-mentioned objects, firstly, the present invention provides a carbon nanoring composed of monolayered or multilayered coaxial carbon rings, wherein the carbon ring has a structure similar to that of a closed ring system formed by graphite sheet being rolled, and each of an axial dimension and a radial dimension of the carbon nanoring is nanoscale with the axial dimension being smaller than the radial dimension.

The carbon rings in the carbon nanoring provided by the present invention can also be considered as an ultrashort carbon nanotube in which a carbon atom arrangement is substantially the same as in the carbon nanotube. The carbon nanoring provided by the invention can be composed of monolayered or multilayered coaxial carbon rings which have a structure similar to that of a closed ring system formed by graphite sheet being rolled.

In the present invention, as shown in FIG. 1, "axial dimension" means the distance from the section on one side of the carbon ring to the section on another thereof, that is, the height of the carbon ring; "radial dimension" refers to the diameter of the outmost layer of the carbon ring.

According to the specific technical solution of the present invention, the carbon nanoring provided by the present invention has the axial dimension of 0.5 to 1.0 nm, and the radial dimension of 2 to 30 nm.

According to the specific technical solution of the present invention, the carbon nanoring provided by the present invention has a proportion of the axial dimension to the radial dimension of 0.01 to 0.5. The carbon nanoring provided by the invention has a typical ring-shaped structure due to a smaller length-to-diameter ratio.

According to the specific technical solution of the present invention, the carbon nanoring provided by the present invention can be monolayered or multilayered structure, and the carbon ring can have the number of layers of 1 to 25.

According to the specific technical solution of the present invention, when the carbon nanoring is composed of multilayered coaxial carbon rings, the carbon rings can have the same spacing therebetween (between the adjacent layers) with the interlayer distance of 0.31 to 0.37 nm.

The invention also provide a method for preparing the above carbon nanoring including intercalating a long-chain alkyl anion and a carbon source molecule in layered double hydroxides, calcinating such intercalated compound in an inert atmosphere or a reducing atmosphere, growing a carbon nanoring within a confined region between layers of the layered compound under the catalysis of the metal element in layers, and removing the metal and the metal oxide by dissolving in an acid to obtain the target product of the carbon nanoring. The above preparing method as provided by the invention has the process flow shown in FIG. 2 and can include the following specific steps:

(1) A mixed-salt solution is prepared by mixing a soluble salt of divalent metal ion $M^{2+}$, a soluble salt of trivalent metal ion $M^{t3+}$, a soluble salt of long-chain alkyl anion $A^-$ with the carbon source molecule C and dissolving the same in deionized water removed of carbon dioxide;

The mixed-salt solution is mixed with an alkaline solution and reacts with each other for crystallization at 60-80° C. for 6-10 hours under the protection of nitrogen gas to give a suspension, the suspension is filtered and washed with deionized water to obtain a filtrate having a pH of 7-7.5, and then the filter cake is dried at 50-60° C. for 6-12 hours to give a layered double hydroxides of intercalation structure having a chemical composition represented by the following general formula:

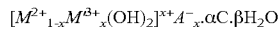

where, x is 0.2-0.33, α is 0.5-4, and β is 0.5-2;

(2) The layered double hydroxides of intercalation structure is calcined for 0.5-3 hours in an inert atmosphere or a reducing atmosphere to give a calcined product, wherein the inert atmosphere is nitrogen gas or argon gas etc., the reducing atmosphere is hydrogen gas, etc. and the calcination temperature is 600-800° C.; and (3) The calcined product is placed in a nitric acid solution with the solid-liquid ratio of 2-5 g/L and subjected to the ultrasonic treatment for 0.5-2 hours, the solution is removed by using centrifugal separation, and then the precipitate obtained by centrifugal separation is washed with deionized water to obtain a filtrate having a pH of 6.5-7 and is dried at 50-60° C. for 6-12 hours to obtain the carbon nanoring.

In the layered double hydroxides of intercalation structure prepared in step (1), the divalent metal ion $M^{2+}$ and the trivalent metal ion $M^{t3+}$ are positioned on the host layer, while long-chain alkyl anion $A^-$, the carbon source molecule C and $H_2O$ molecule are positioned in the interlayer of the layered double hydroxides.

In the above preparing method provided by the invention, the soluble salt of the divalent metal ion $M^{2+}$ as used is one or more of nitrate, sulfate, oxalate, chloride etc. of Mg, Fe, Co, Ni, Cu, Zn, etc.; the soluble salt of the trivalent metal ion $M^{t3+}$ as used is one or more of nitrate, sulfate, oxalate, chloride, etc. of Al, Fe, Co, etc. At least one of the divalent metal ion $M^{2+}$ and the trivalent metal ion $M^{t3+}$ is a metal element having the catalytic activity, which shows a good catalytic action during the growth of the carbon nanoring. Preferably, the metal element having the catalytic activity is Fe, Co, and Ni, and the like.

In the above preparing method provided by the invention, preferably, in step (1), the molar ratio of the divalent metal ion $M^{2+}$ to the trivalent metal ion $M^{t3+}$ is 2-4:1.

In the above preparing method provided by the invention, preferably, in the mixed-salt solution as prepared in step (1), the total concentration of the divalent metal ion $M^{2+}$ and the trivalent metal ion $M^{t3+}$ is 0.2-0.5 mol/L.

In the above preparing method provided by the invention, preferably, the soluble salt of the long-chain alkyl anion $A^-$ as used is one or more of sodium dodecylsulfate, sodium dodecylsulfonate, sodium dodecylbenzenesulfonate, potassium dodecyl sulfate, potassium dodecylsulfonate, potassium dodecylbenzenesulfonate, etc.

In the above preparing method provided by the invention, preferably, in the mixed-salt solution as prepared in step (1), the long-chain alkyl anion $A^-$ has the same number of moles as that of the trivalent metal ion $M^{t3+}$ in the mixed-salt solution; that is to say, the soluble salt of the long-chain alkyl anion $A^-$ is so added that the long-chain alkyl anion $A^-$ is equal to the trivalent metal ion $M^{t3+}$ in term of the number of moles.

In the above preparing method provided by the invention, preferably, the carbon source molecule C as used is one or more of methyl methacrylate, n-pentane, benzene, toluene, xylene, styrene, etc. The carbon source molecule C has the number of moles being 1.2-12 times of the number of moles of the trivalent metal ion $M^{t3+}$ in the mixed-salt solution as prepared in step (1).

In the above preparing method provided by the invention, preferably, in step (1), the alkaline solution as used is a solution with the concentration of 2-5 mol/L prepared by dissolving sodium hydroxide or potassium hydroxide in deionized water removed of carbon dioxide. The number of moles of the alkali in the alkaline solution is 2 times of the total number of moles of the divalent metal ion $M^{2+}$ and the trivalent metal ion $M^{t3+}$.

In the above preparing method provided by the invention, preferably, in step (3), the concentration of the nitric acid solution as used is 10-30% by mass.

In the above preparing method provided by the invention, preferably, in step (3), the centrifugal separation is carried out with the rotation speed of 3000-9000 revolutions/min for 1 to 10 minutes.

The carbon nanoring provided by the invention is characterized with respect to its Raman activity by using the laser Raman spectrometer and shows typical Raman spectrum as shown in FIG. 10. In FIG. 10, G peak attributes to $sp^2$ hybridized carbon atoms in the six-membered ring, and D peak attributes to edge carbon atoms containing defects. The carbon nanoring has a significantly enhanced D peak as compared with the carbon nanotube, indicating that the carbon nanoring provided by the invention has more edge carbons and dangling bonds; in addition, the carbon nanoring shows Raman activity both in RBM band frequently used for characterizing the single-walled carbon nanotube and in 2G band for characterizing graphene, which demonstrates that the carbon nanoring provided by the invention has certain characteristics of carbon nanotubes and graphene.

The carbon nanoring provided by the invention that is one allotrope of carbon has the novel nano-ring shaped structure and the excellent properties of carbon materials, and hence can be used as one important structural unit in the nanodevice, showing broad application prospects. Moreover, since the carbon nanoring provided by the invention combines the properties of carbon nanotubes with the properties of grapheme, and has more edge carbons and dangling bonds with high reactive activity, it is very important in application of the field of functional material such as energy storage and sensing. In addition, the method for preparing the carbon nanoring according to the invention is advantageous in that a simple operational process can be achieved, and the carbon nanoring can be effectively controlled in terms of its axial dimension and radial dimension, and the number of layers of the carbon ring thereof.

DETAILED DESCRIPTION

Example 1

Figure 1:
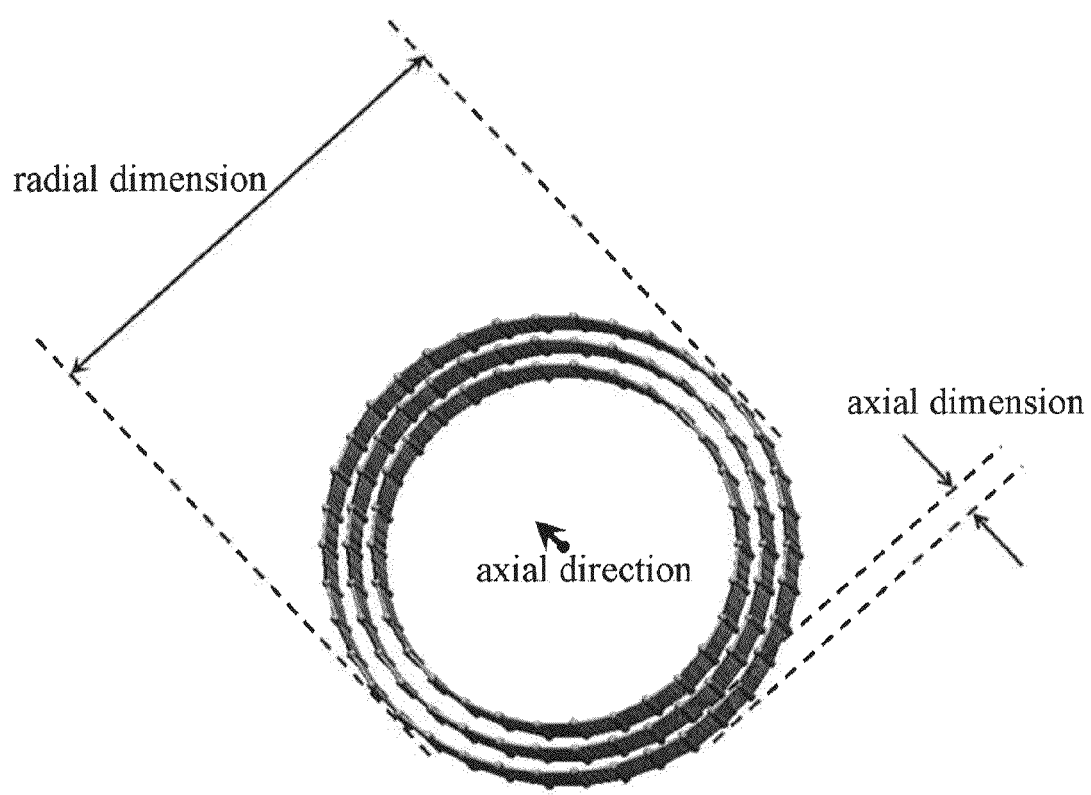
FIG. 1 is the schematic diagram showing the structure of the carbon nanoring as provided by the present invention.
Figure 2:
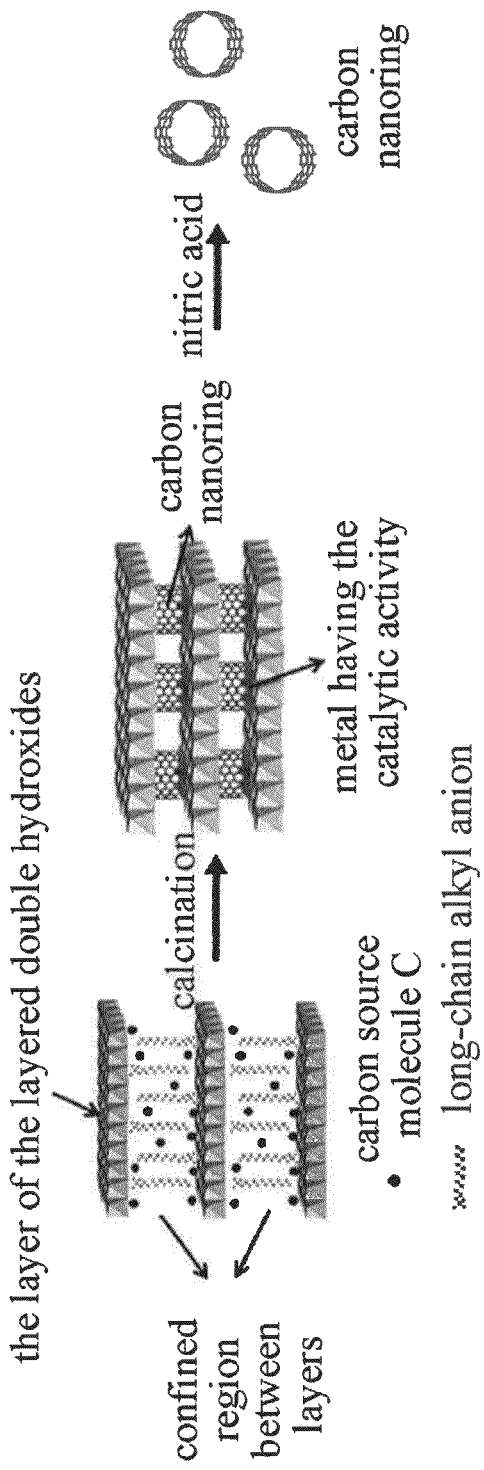
FIG. 2 is the schematic diagram showing the process flow for preparing the carbon nanoring according to the present invention.
Figure 3:
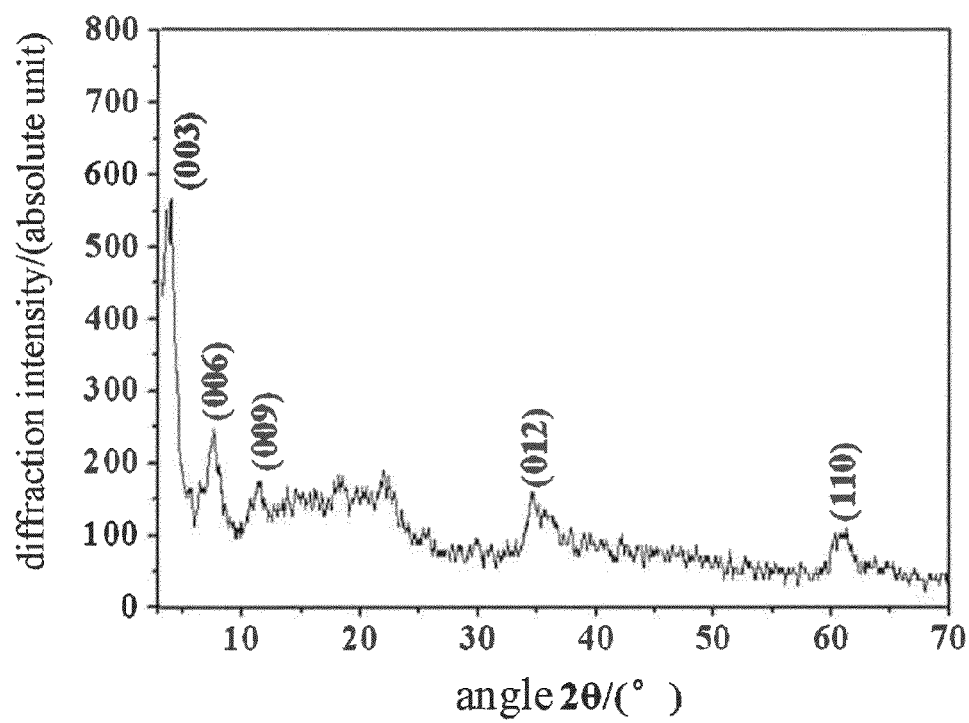
FIG. 3 is the X-ray diffraction diagram of the layered double hydroxides of intercalation structure as prepared in Example 1, in which the abscissa is angle 2θ with the unit of °, and the ordinate is diffraction intensity with the unit of absolute unit (a.u.)
Figure 4:
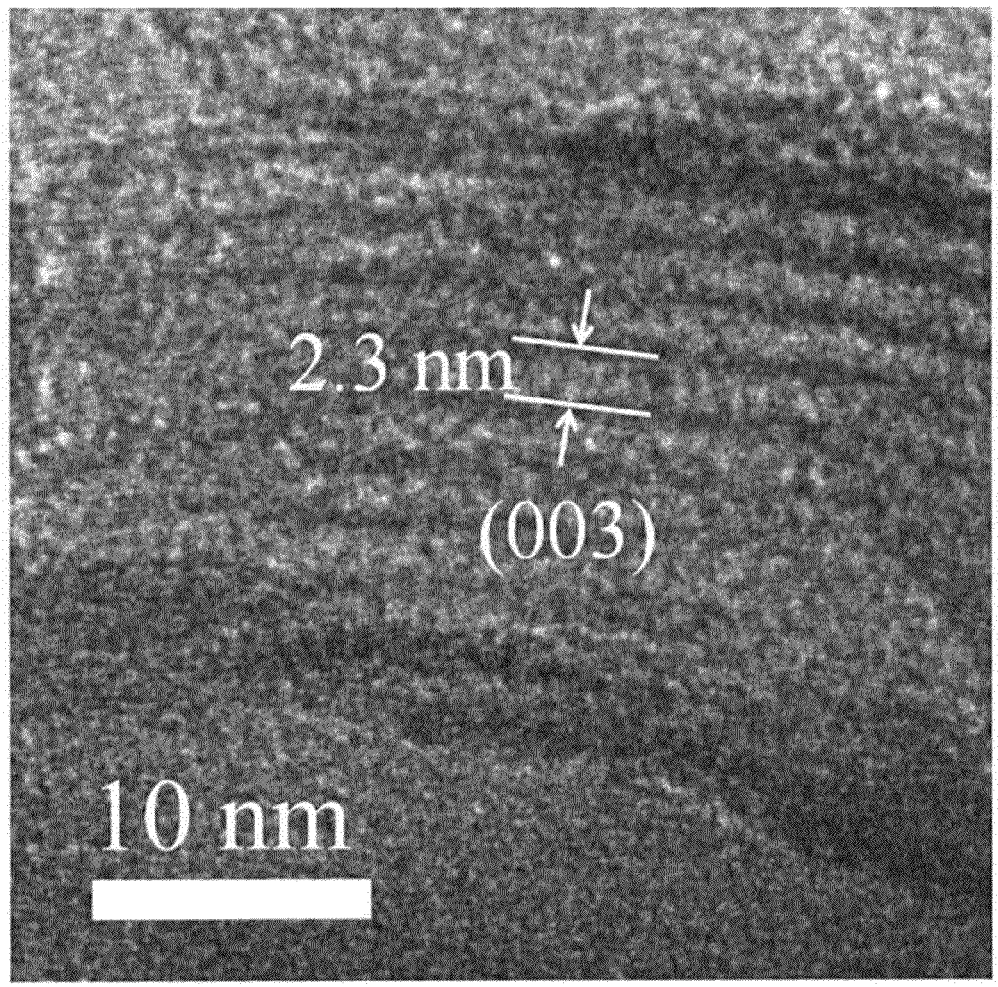
FIG. 4 is a transmission electron microscopic image with high-resolution showing the layered double hydroxides of intercalation structure as prepared in Example 1.
Figure 5:
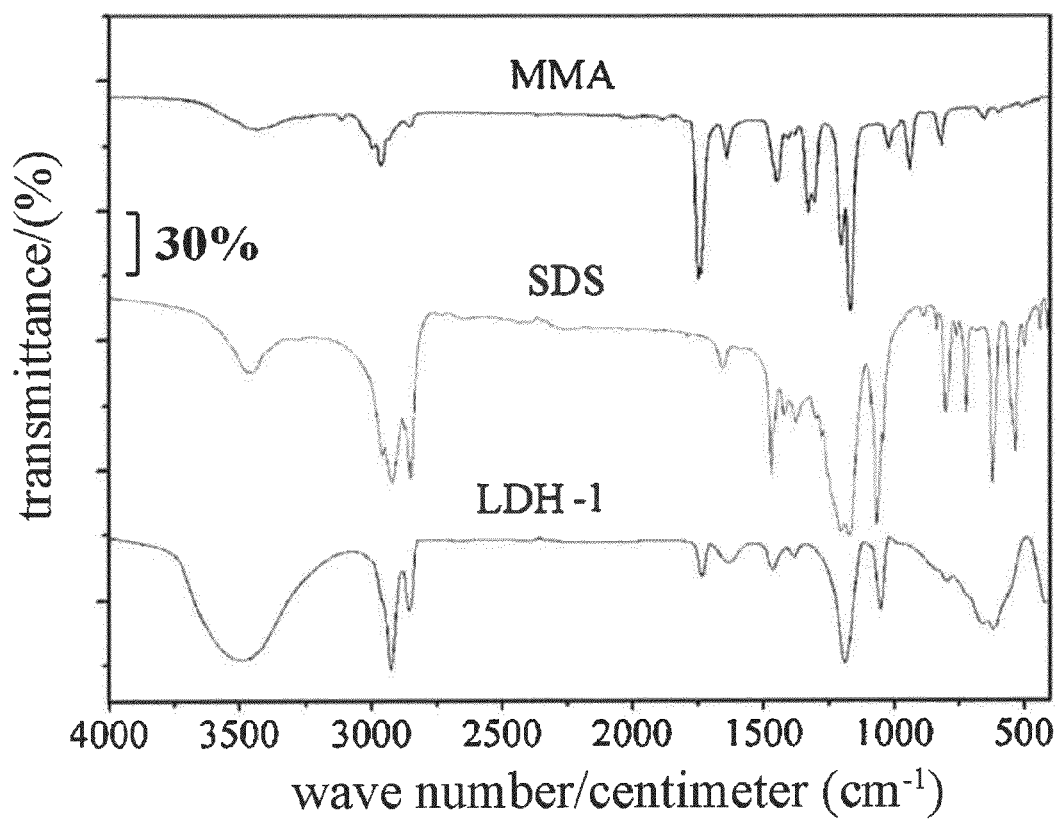
FIG. 5 is IR spectrum showing methyl methacrylate (abbreviated as MMA), sodium dodecylsulfate (abbreviated as SDS), and the layered double hydroxides of intercalation structure in Example 1, in which the abscissa is wave number with unit of $cm^{-1}$, and the ordinate is transmittance with the unit of percentage (%)
Figure 6:
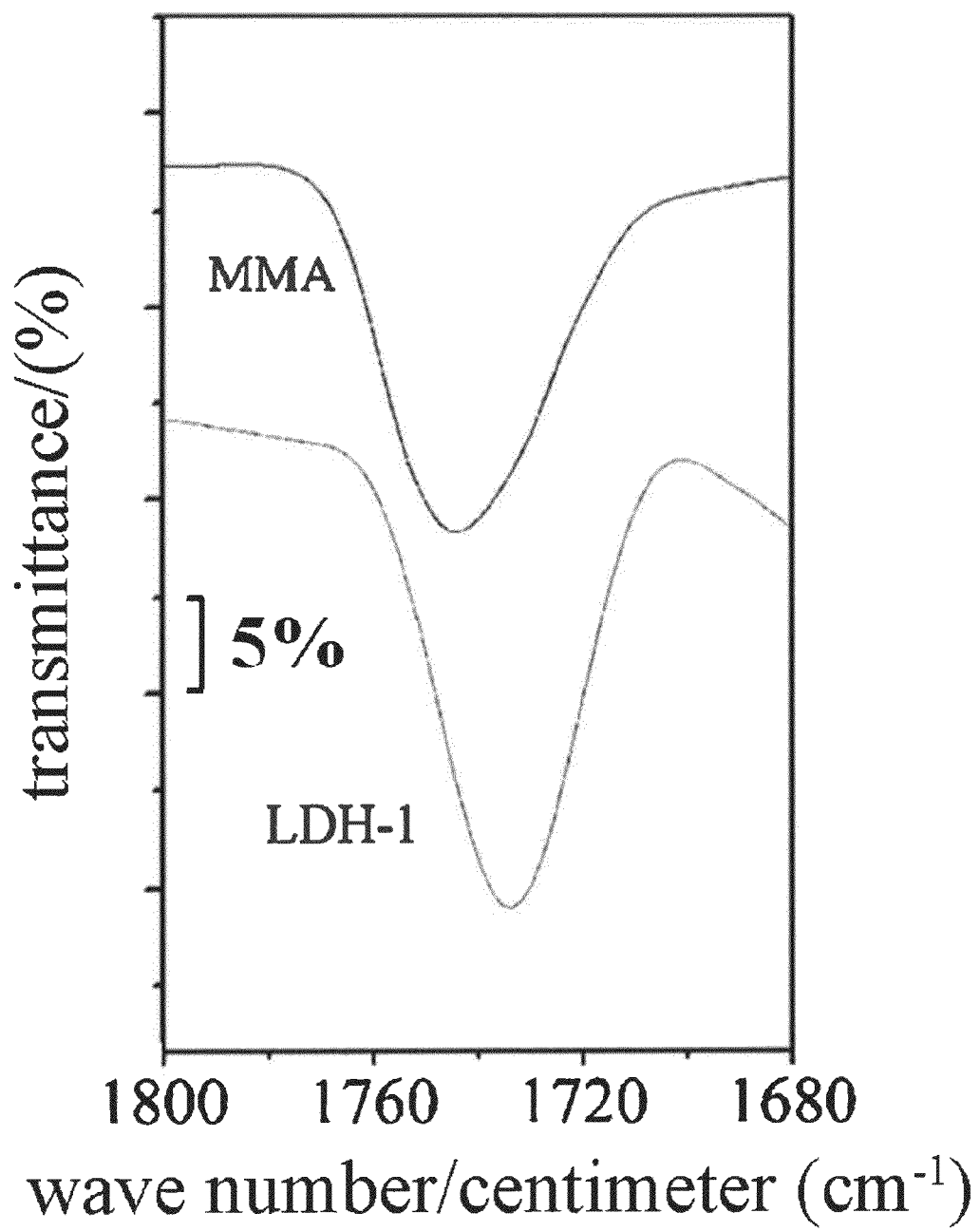
FIG. 6 is IR spectrum of methyl methacrylate in Example 1 within the range of 1800-1680 $cm^{-1}$ showing the change in spectrum thereof before and after the intercalation, in which the abscissa is wave number with unit of $cm^{-1}$, and the ordinate is transmittance with the unit of percentage (%)

0.075 mol of cobalt nitrate ($Co(NO_3)_2 \cdot 6H_2O$), 0.025 mol of aluminium nitrate ($Al(NO_3)_3 \cdot 9H_2O$), 0.025 mol of sodium dodecylsulfate (dodecyl sulfate ion is abbreviated as $DS^-$) and 0.25 mol of methyl methacrylate (MMA) were dissolved in 300 mL deionized water removed of carbon dioxide, and then were mixed and stirred for 20 minutes under the protection of nitrogen gas to give a clear and transparent pink mixed-salt solution;

To the above mixed-salt solution, was dropwisely added 80 mL NaOH solution with the concentration of 2.5 mol/L as formulated by deionized water removed of carbon dioxide while stirring under the protection of nitrogen gas, so as to obtain a mixed solution;

The above mixed solution was allowed to react at 80° C. for 8 hours in the atmosphere of nitrogen gas to give a suspension, the suspension was filtered and washed with deionized water to obtain a filtrate having a pH of 7.2, and then the filter cake was dried at 50° C. for 12 hours to give a layered double hydroxides of intercalation structure that is recorded as LDH-1. FIGS. 3 and 4 are X-ray diffraction diagram and transmission electron microscopic image with high-resolution of LDH-1, respectively. It can be concluded from the data in FIG. 3 that LDH-1 has a layered structure, and the peak as indicated by symbol 003 characterized that the interlayer distance is 2.34 nm. According to FIG. 4, it can be obtained that interplanar spacing [003] is 2.3 nm. FIG. 5 is IR spectrum showing methyl methacrylate, sodium dodecylsulfate, and LDH-1, FIG. 6 is IR spectrum of methyl methacrylate within the range of 1800-1680 $cm^{-1}$ showing the change in spectrum thereof before and after the intercalation. It can be seen from FIGS. 5 and 6 that the characteristic peak of MMA significantly changed between before and after intercalation; after intercalation of MMA, C—O bond can shift to lower wave number due to the interaction between oxygen atom in C—O bond and the hydroxyl in the layered double hydroxides layer, which proves that MMA intercalated in the interlayer of the layered double hydroxides assuredly. The proportion of metal elements was measured by inductively coupled plasma atomic emission spectroscopy and was shown in Table 1; four elements of C, H, O, and S were measured for their percentages by mass based on the total mass through organic elemental analysis and were shown in Table 2; after calculation, percentage content of each element (on a molar basis) was obtained and shown in Table 3, thus obtaining its chemical composition as follows: $[Co^{2+}_{0.75}Al^{3+}_{0.25}(OH)_2]^{0.25+}(DS^-)_{0.25} \cdot 2.3MMA \cdot 0.8H_2O$.

TABLE 1

Inductively Coupled Plasma Atomic Emission Spectroscopy Data

Concentration of element/ppm

| Co | Al | nCo/nAl |
|---|---|---|
| 54.22 | 8.27 | 3/1 |

TABLE 2

Organic Elemental Analysis Data
Percentage content of element (by mass)/%

| O | C | S | H |
|---|---|---|---|
| 33.96 | 43.97 | 2.03 | 7.14 |

TABLE 3

Percentage Content Of Each Element (on a molar basis)
percentage content of element (on a molar basis)/%

| Co | Al | O | C | S | H |
|---|---|---|---|---|---|
| 1.43 | 0.48 | 16.03 | 27.67 | 0.48 | 53.91 |

Under the nitrogen atmosphere, the above layered double hydroxide was calcined at 800° C. for 1 hour to give a calcined product;

1 g of the calcined product was placed in 200 mL nitric acid solution with the concentration of 30% by mass and subjected to the ultrasonic treatment for 1 hour, the centrifugal separation was carried out with the rotation speed of 9000 revolutions/min for 1 minute, and then the precipitate obtained by centrifugal separation was washed with deionized water to obtain a filtrate having a pH of 6.5 as to obtain the target product of carbon nanoring C1 after removing the metal and metal oxide.

Figure 7:
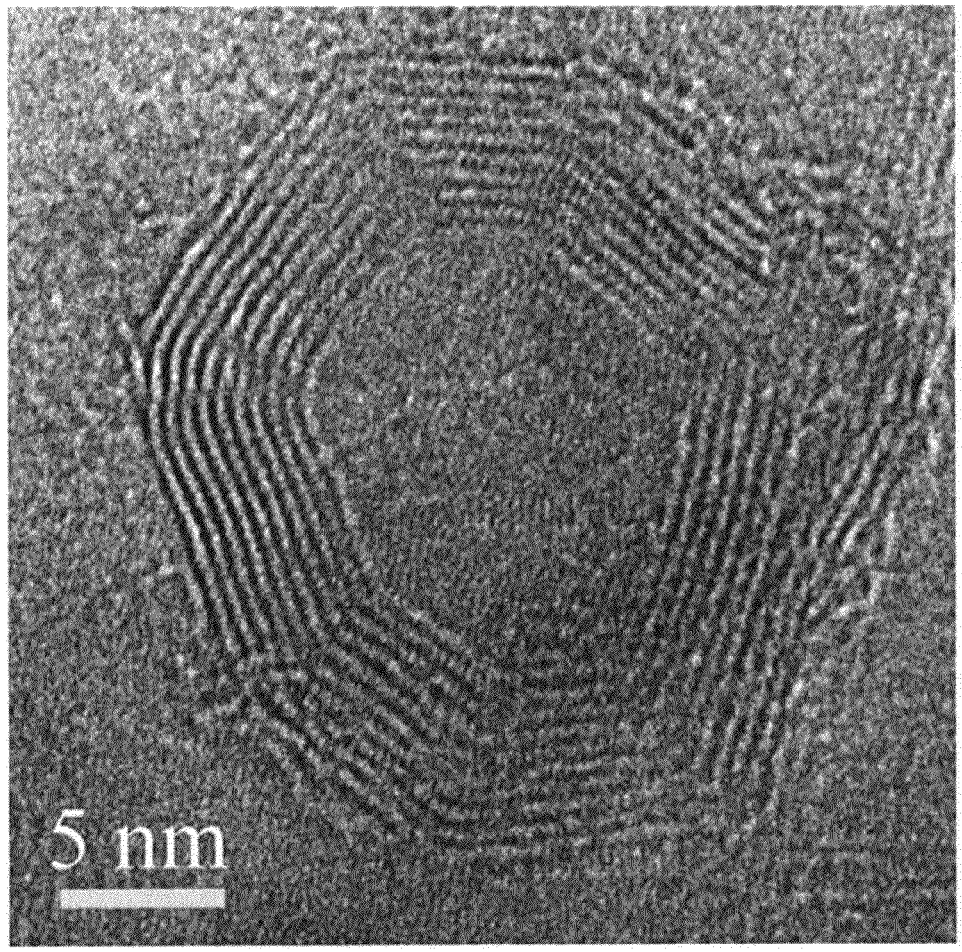
FIG. 7 is a transmission electron microscopic image with high-resolution showing the carbon nanoring as prepared in Example 1.
Figure 8:
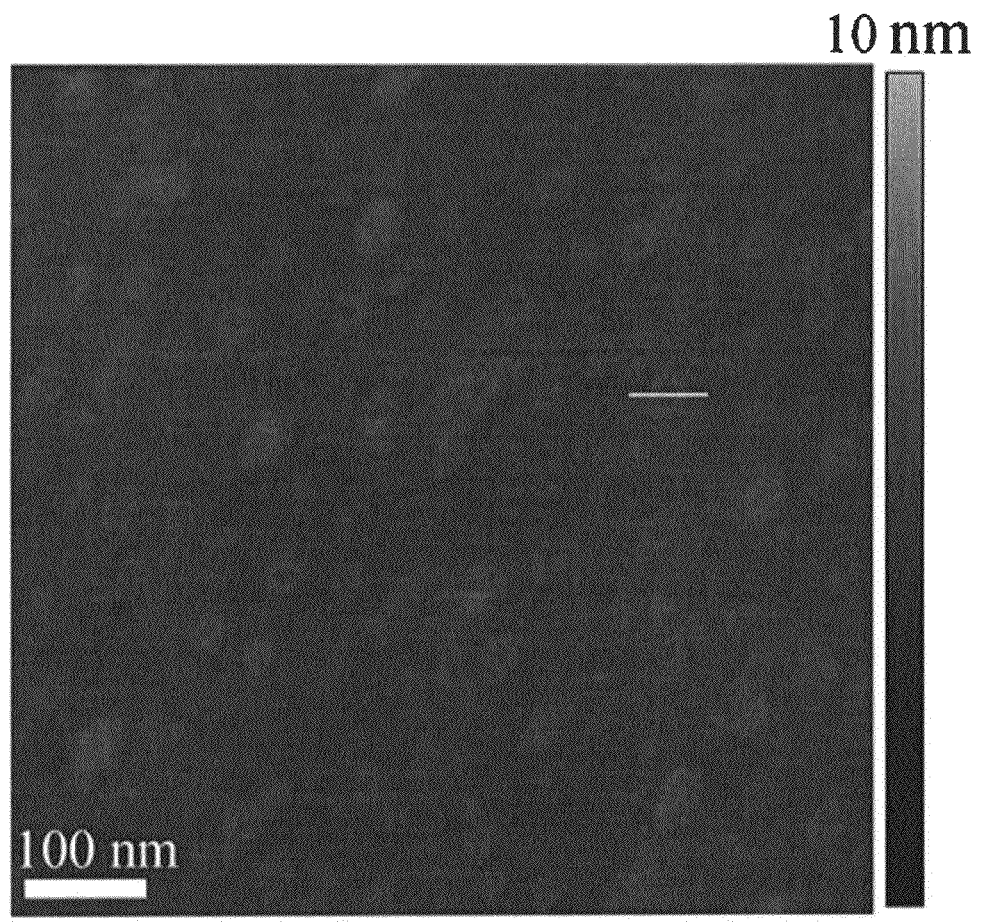
FIG. 8 is an atomic force microscopic image showing the carbon nanoring as prepared in Example 1.
Figure 9:
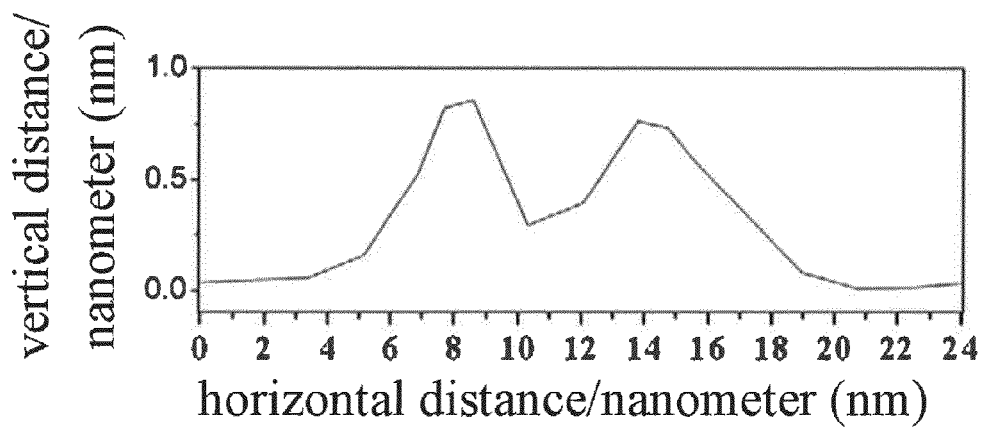
FIG. 9 is a height map of the white line as shown in FIG. 8, in which the abscissa is horizontal distance with the unit of nanometer (nm), and the ordinate is vertical distance with the unit of nanometer (nm)

Carbon nanoring C1 was characterized by using transmission electron microscopy with high-resolution and was shown as in transmission electron microscopic image of FIG. 7. It can be seen from FIG. 7 that such carbon nanoring C1 includes 10 layers of carbon rings and a radial dimension of about 16 nm. Also, carbon nanoring C1 was characterized by atomic force microscopy and was shown as in atomic force microscopic image of FIG. 8. FIG. 9 is a height map of the white line as shown in FIG. 8, from which it can be seen that this carbon nanoring has an axial dimension of about 0.8 nm and a proportion of the axial dimension to the radial dimension of 0.05.

Figure 10:
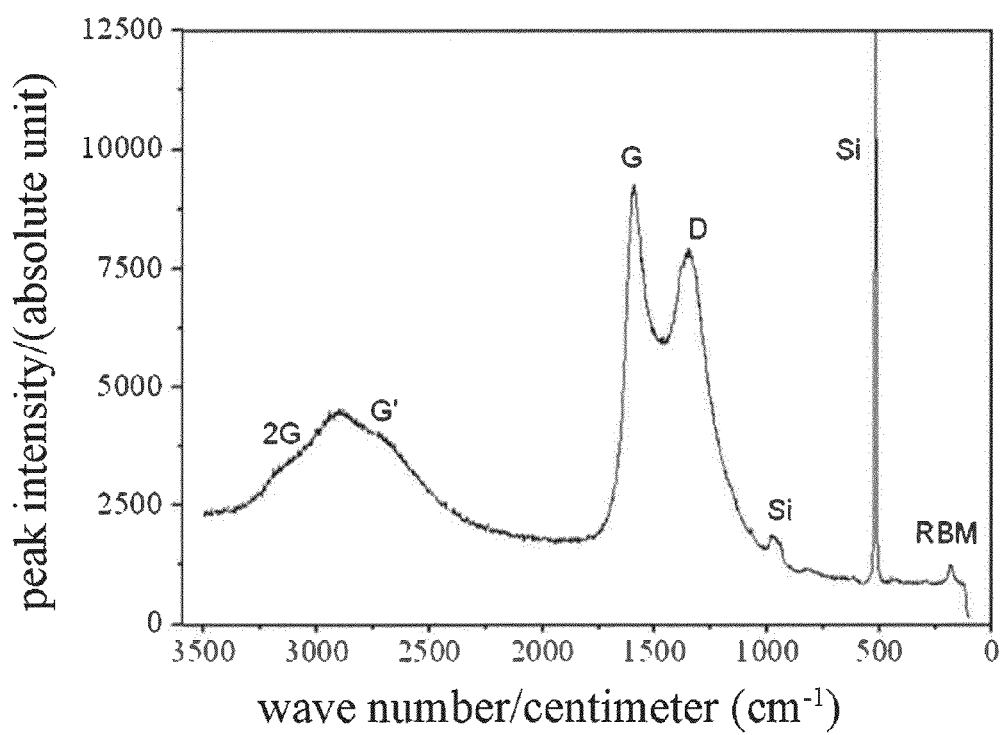
FIG. 10 is Raman spectrum of the carbon nanoring as prepared in Example 1, in which the abscissa is wave number with unit of $cm^{-1}$, and the ordinate is peak intensity with the unit of absolute unit (a.u.)

FIG. 10 showed Raman spectrum of carbon nanoring C1, in which G peak attributes to $sp^2$ hybridized carbon atoms in the six-membered ring, and D peak attributes to edge carbon atoms containing defects. The carbon nanoring has a significantly enhanced D peak as compared with the carbon nanotube, indicating that the carbon nanoring has more edge carbons and dangling bonds; in addition, the carbon nanoring shows Raman activity both in RBM band frequently used for characterizing the single-walled carbon nanotube and in 2G band for characterizing graphene, which demonstrates that the carbon nanoring has certain characteristics of carbon nanotubes and grapheme.

Example 2

Figure 11:
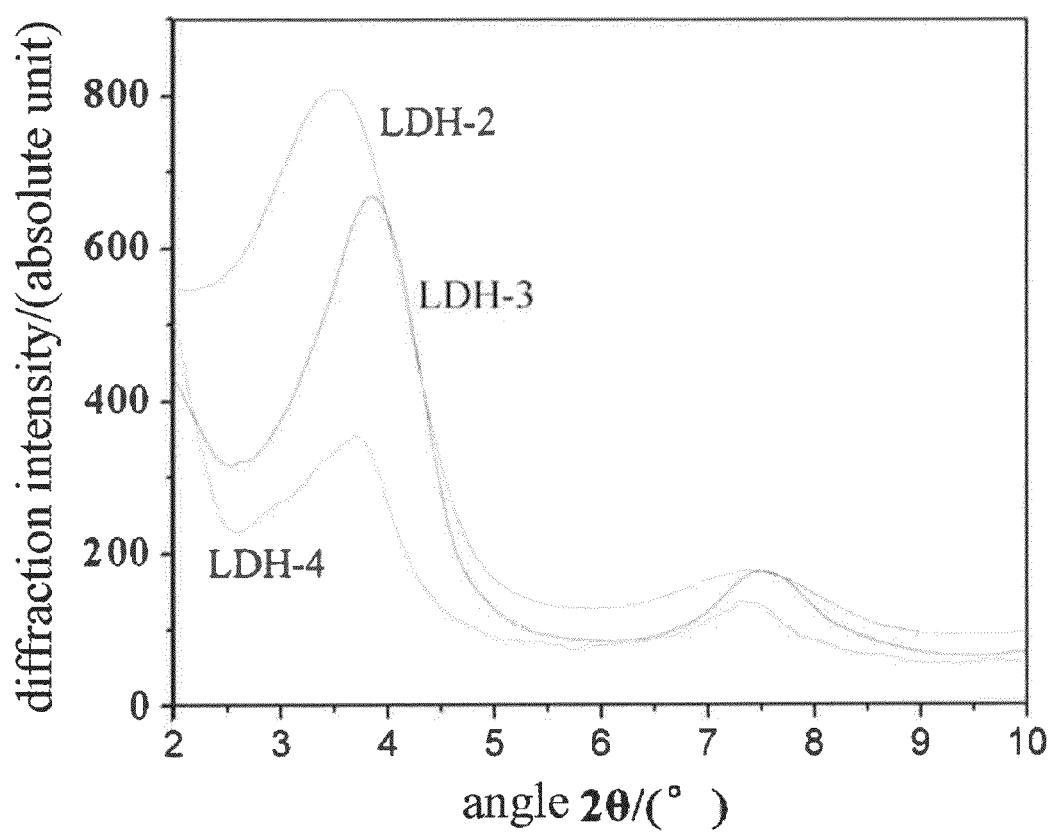
FIG. 11 is the X-ray diffraction diagram of the layered double hydroxides of intercalation structure as prepared in Examples 2, 3, and 4, in which the abscissa is angle 2θ with the unit of °, and the ordinate is diffraction intensity with the unit of absolute unit (a.u.)

0.025 mol of cobalt nitrate ($Co(NO_3)_2.6H_2O$), 0.025 mol of magnesium nitrate ($Mg(NO_3)_2.6H_2O$), 0.025 mol of aluminium nitrate ($Al(NO_3)_3.9H_2O$), 0.025 mol of sodium dodecylsulfonate (dodecyl sulfonate ion is abbreviated as $DSO^-$) and 0.75 mol of n-pentane (P) were dissolved in 150 mL deionized water removed of carbon dioxide, and then were mixed and stirred for 20 minutes under the protection of nitrogen gas to give a clear and transparent pink mixed-salt solution;

To the above mixed-salt solution, was dropwisely added 30 mL NaOH solution with the concentration of 5 mol/L as formulated by deionized water removed of carbon dioxide while stirring under the protection of nitrogen gas, so as to obtain a mixed solution;

The above mixed solution was allowed to react at 70° C. for 10 hours in the atmosphere of nitrogen gas to give a suspension, the suspension was filtered and washed with deionized water to obtain a filtrate having a pH of 7.5, and then the filter cake was dried at 60° C. for 8 hours to give a layered double hydroxides of intercalation structure that is recorded as LDH-2. FIG. 11 is the X-ray diffraction diagram of LDH-2. The proportion of metal elements was measured by inductively coupled plasma atomic emission spectroscopy and was shown in Table 4; four elements of C, H, O, and S were measured for their percentages by mass based on the total mass through organic elemental analysis and were shown in Table 5; after calculation, percentage content of each element (on a molar basis) was obtained and shown in Table 6, thus obtaining its chemical composition as follows:

$$[Co^{2+}_{0.33}Mg^{2+}_{0.33}Al^{3+}_{0.33}(OH)_2]^{0.33+}(DSO^-)_{0.33}.3.7P.0.6H_2O.$$

TABLE 4

Inductively Coupled Plasma Atomic Emission Spectroscopy Data

| Concentration of element/ppm | | | |
|---|---|---|---|
| Co | Mg | Al | (nCo + nMg)/nAl |
| 51.32 | 21.14 | 23.48 | 2/1 |

TABLE 5

Organic Elemental Analysis Data
Percentage content of element (by mass)/%

| O | C | S | H |
|---|---|---|---|
| 13.37 | 62.64 | 2.48 | 12.98 |

TABLE 6

Percentage Content Of Each Element (on a molar basis)
percentage content of element (on a molar basis)/%

| Co | Mg | Al | O | C | S | H |
|---|---|---|---|---|---|---|
| 0.40 | 0.40 | 0.40 | 4.32 | 26.99 | 0.40 | 67.09 |

Under the nitrogen atmosphere, the above layered double hydroxide was calcined at 600° C. for 3 hours to give a calcined product'

1 g of the calcined product was placed in 500 mL nitric acid solution with the concentration of 20% by mass and subjected to the ultrasonic treatment for 0.5 hour, the centrifugal separation was carried out with the rotation speed of 7000 revolutions/min for 5 minutes, and then the precipitate obtained by centrifugal separation was washed with deionized water to obtain a filtrate having a pH of 7.0 as to obtain the target product of carbon nanoring C2 after removing the metal and metal oxide.

Figure 12:
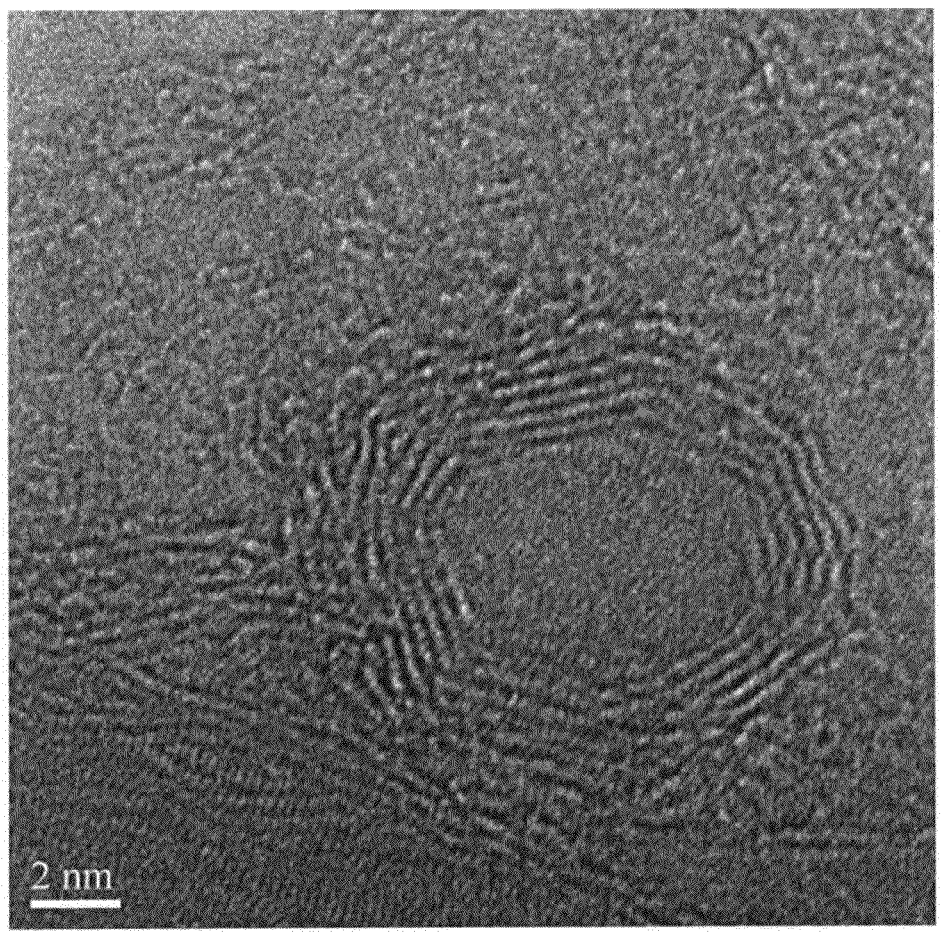
FIG. 12 is a transmission electron microscopic image with high-resolution showing the carbon nanoring as prepared in Example 2.

Carbon nanoring C2 was characterized by using transmission electron microscopy with high-resolution and was shown as in FIG. 12. It can be observed that such carbon nanoring C2 includes 4 layers of carbon rings, and has a radial dimension of about 5.6 nm, an axial dimension of 0.76 nm, and a proportion of the axial dimension to the radial dimension of 0.14.

Example 3

0.1 mol of zinc nitrate ($Zn(NO_3)_2.6H_2O$), 0.01 mol of ferric nitrate ($Fe(NO_3)_3.9H_2O$), 0.015 mol of aluminium nitrate ($Al(NO_3)_3.9H_2O$), 0.025 mol of sodium dodecylbenzene sulfonate (dodecylbenzene sulfonate ion is abbreviated as $DBS^-$) and 0.5 mol of toluene (MB) were dissolved in 625 mL deionized water removed of carbon dioxide, and then were mixed and stirred for 20 minutes under the protection of nitrogen gas to give a clear and transparent yellow mixed-salt solution To the above mixed-salt solution, was dropwisely added 100 mL NaOH solution with the concentration of 2.5 mol/L as formulated by deionized water removed of carbon dioxide while stirring under the protection of nitrogen gas, so as to obtain a mixed solution;

The above mixed solution was allowed to react at 60° C. for 6 hours in the atmosphere of nitrogen gas to give a suspension, the suspension was filtered and washed with deionized water to obtain a filtrate having a pH of 7.0, and then the filter cake was dried at 55° C. for 6 hours to give a layered double hydroxides of intercalation structure that is recorded as LDH-3. FIG. 11 is the X-ray diffraction diagram of LDH-3. The proportion of metal elements was measured by inductively coupled plasma atomic emission spectroscopy and was shown in Table 7; four elements of C, H, O, and S were measured for their percentages by mass based on the total mass through organic elemental analysis and were shown in Table 8; after calculation, percentage content of each element (on a molar basis) was obtained and shown in Table 9, thus obtaining its chemical composition as follows: $[Zn^{2+}_{0.8}Fe^{3+}_{0.08}Al^{3+}_{0.12}(OH)_2]^{0.2+}(DBS^-)_{0.2} \cdot 1.6MB \cdot 1.3H_2O$.

TABLE 7

Inductively Coupled Plasma Atomic Emission Spectroscopy Data

Concentration of element/ppm

| Zn | Fe | Al | nZn/(nFe + nAl) |
|---|---|---|---|
| 64.54 | 5.512 | 3.997 | 4/1 |

TABLE 8

Organic Elemental Analysis Data
Percentage content of element (by mass)/%

| O | C | S | H |
|---|---|---|---|
| 18.94 | 53.89 | 1.92 | 7.04 |

TABLE 9

Percentage Content Of Each Element (on a molar basis)
percentage content of element (on a molar basis)/%

| Zn | Fe | Al | O | C | S | H |
|---|---|---|---|---|---|---|
| 1.86 | 0.18 | 0.28 | 9.05 | 34.34 | 0.46 | 53.83 |

Under the nitrogen atmosphere, the above layered double hydroxide was calcined at 700° C. for 0.5 hours to give a calcined product;

1.5 g of the calcined product was placed in 500 mL nitric acid solution with the concentration of 10% by mass and subjected to the ultrasonic treatment for 1.5 hours, the centrifugal separation was carried out with the rotation speed of 5000 revolutions/min for 7 minutes, and then the precipitate obtained by centrifugal separation was washed with deionized water to obtain a filtrate having a pH of 6.8 as to obtain the target product of carbon nanoring C3 after removing the metal and metal oxide.

Figure 13:
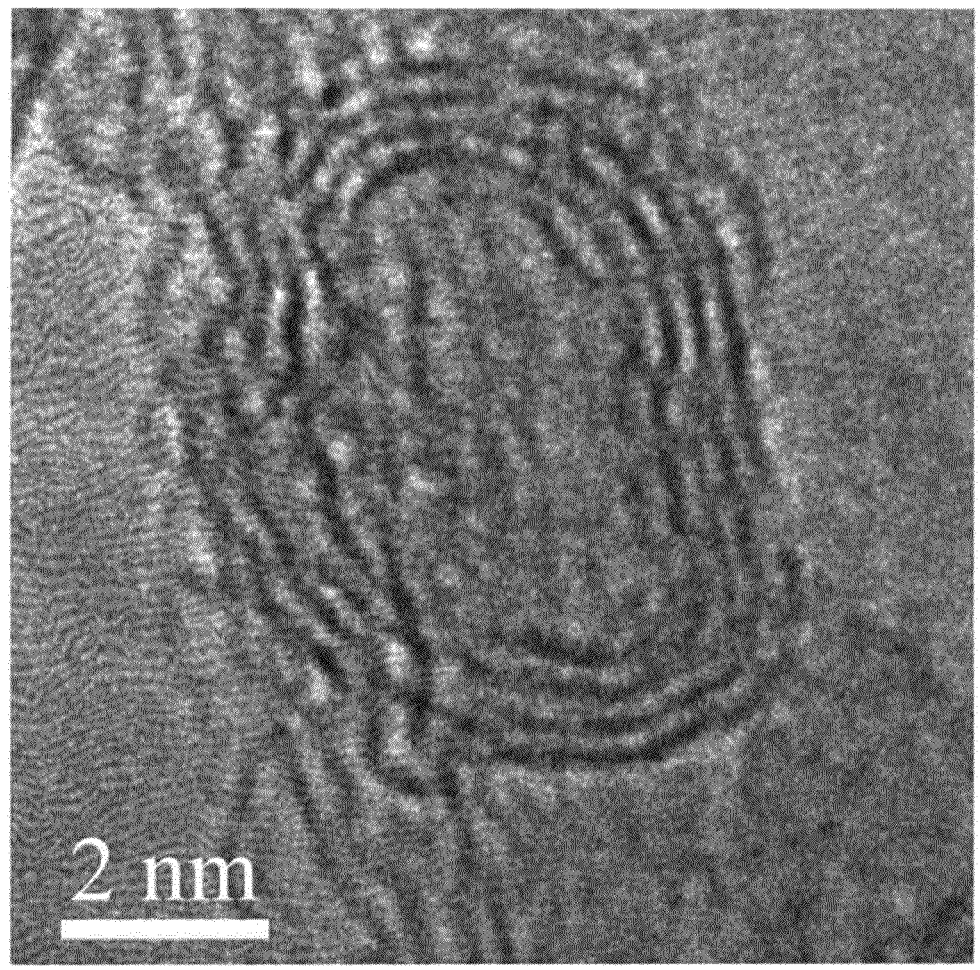
FIG. 13 is a transmission electron microscopic image with high-resolution showing the carbon nanoring as prepared in Example 3.

Carbon nanoring C3 was characterized by using transmission electron microscopy with high-resolution and was shown as in FIG. 13. It can be observed that such carbon nanoring C3 has a radial dimension of 4.4 nm, an axial dimension of 0.68 nm, and a proportion of the axial dimension to the radial dimension of 0.15.

Example 4

0.0375 mol of nickel chlorite ($NiCl_2 \cdot 6H_2O$), 0.025 mol of ferrous chloride ($FeCl_2 \cdot 4H_2O$), 0.025 mol of aluminium chloride ($AlCl_3 \cdot 6H_2O$), 0.025 mol of sodium dodecylsulfate (dodecyl sulfate ion is abbreviated as $DS^-$) and 0.125 mol of styrene (S) were dissolved in 220 mL deionized water removed of carbon dioxide, and then were mixed and stirred for 20 minutes under the protection of nitrogen gas to give a clear and transparent green mixed-salt solution;

To the above mixed-salt solution, was dropwisely added 50 mL NaOH solution with the concentration of 3.5 mol/L as formulated by deionized water removed of carbon dioxide while stirring under the protection of nitrogen gas, so as to obtain a mixed solution;

The above mixed solution was allowed to react at 75° C. for 7 hours in the atmosphere of nitrogen gas to give a suspension, the suspension was filtered and washed with deionized water to obtain a filtrate having a pH of 7.3, and then the filter cake was dried at 55° C. for 10 hours to give a layered double hydroxides of intercalation structure that is recorded as LDH-4. FIG. 11 is the X-ray diffraction diagram of LDH-4. The proportion of metal elements was measured by inductively coupled plasma atomic emission spectroscopy and was shown in Table 10; four elements of C, H, O, and S were measured for their percentages by mass based on the total mass through organic elemental analysis and were shown in Table 11; after calculation, percentage content of each element (on a molar basis) was obtained and shown in Table 12, thus obtaining its chemical composition as follows: $[Ni^{2+}_{0.44}Fe^{2+}_{0.28}Al^{3+}_{0.28}(OH)_2]^{0.28+}(DS^-)_{0.28} \cdot 0.7S \cdot 1.9H_2O$.

TABLE 10

Inductively Coupled Plasma Atomic Emission Spectroscopy Data

Concentration of element/ppm

| Ni | Fe | Al | (nNi + nFe)/nAl |
|---|---|---|---|
| 46.57 | 28.20 | 13.63 | 2.57/1 |

TABLE 11

Organic Elemental Analysis Data
Percentage content of element (by mass)/%

| O | C | S | H |
|---|---|---|---|
| 30.39 | 40.70 | 1.14 | 6.96 |

TABLE 12

Percentage Content Of Each Element (on a molar basis)
percentage content of element (on a molar basis)/%

| Ni | Fe | Al | O | C | S | H |
|---|---|---|---|---|---|---|
| 1.31 | 0.83 | 0.83 | 14.91 | 26.62 | 0.83 | 54.67 |

Under the nitrogen atmosphere, the above layered double hydroxide was calcined at 750° C. for 2 hours to give a calcined product;

1 g of the calcined product was placed in 250 mL nitric acid solution with the concentration of 20% by weight and subjected to the ultrasonic treatment for 2 hours, the centrifugal separation was carried out with the rotation speed of 3000 revolutions/min for 10 minutes, and then the precipitate obtained by centrifugal separation was washed with deionized water to obtain a filtrate having a pH of 6.7 as to obtain the target product of carbon nanoring C4 after removing the metal and metal oxide.

Figure 14:
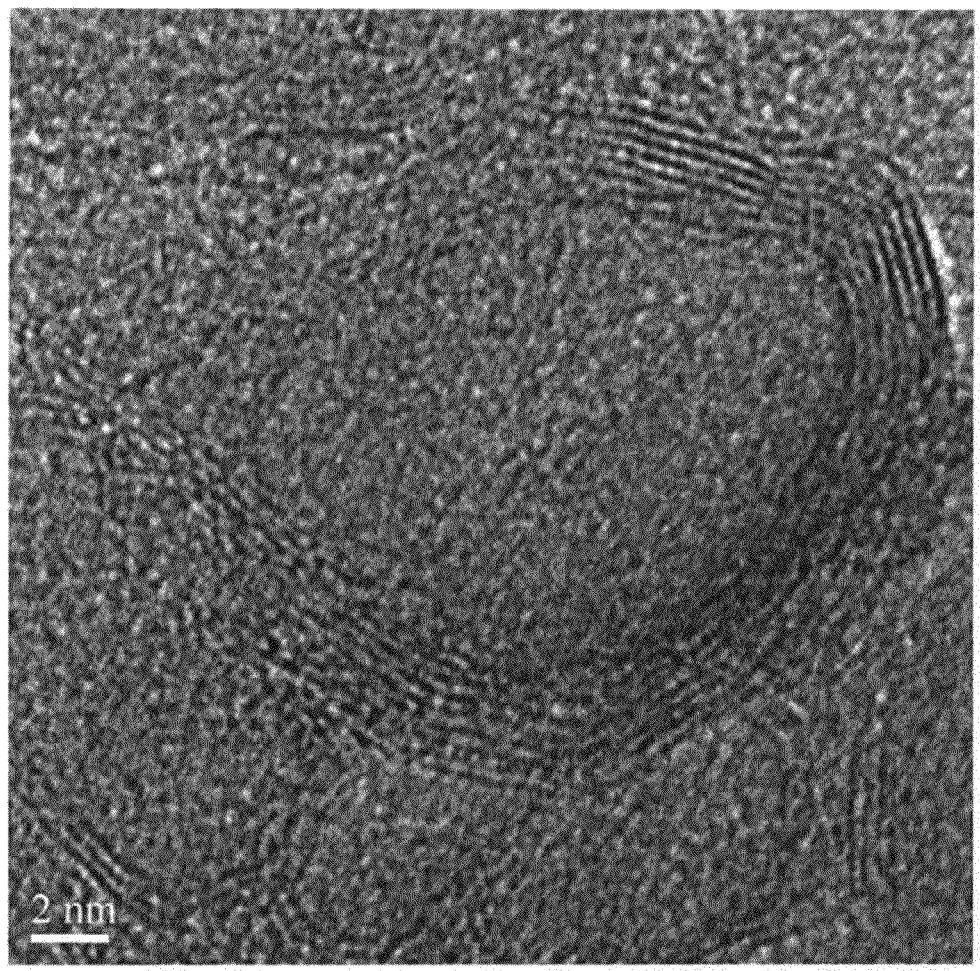
FIG. 14 is a transmission electron microscopic image with high-resolution showing the carbon nanoring as prepared in Example 4.

Carbon nanoring C4 was characterized by using transmission electron microscopy with high-resolution and was shown as in FIG. 14. It can be observed that such carbon nanoring C4 has a radial dimension of 24.4 nm, an axial dimension of 0.74 nm, and a proportion of the axial dimension to the radial dimension of 0.03.

The invention claimed is:

1. A method for preparing a carbon nanoring composed of monolayered or multilayered coaxial carbon rings, wherein the carbon nanoring has a structure similar to that of a closed ring system formed by graphite sheet being rolled, and an axial dimension of the carbon nanoring is 0.5 to 1.0 nm and a radial dimension of the carbon nanoring is 2 to 30 nm, the method including the following steps:

(1) a mixed-salt solution is prepared by mixing a soluble salt of divalent metal ion $M^{2+}$, a soluble salt of trivalent metal ion $M'^{3+}$, a soluble salt of long-chain alkyl anion $A^-$ with a carbon source molecule C and dissolving the same in deionized water removed of carbon dioxide;

the mixed-salt solution is mixed with an alkaline solution and reacts with each other for crystallization at 60-80° C. for 6-10 hours, under the protection of nitrogen gas, to give a suspension, the suspension is filtered and washed with deionized water to obtain a filtrate having a pH of 7-7.5, and then a filter cake is dried at 50-60° C. for 6-12 hours to give a layered double hydroxides of intercalation structure having a chemical composition represented by the following general formula:

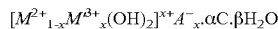

where, x is 0.2-0.33, α is 0.5-4, and β is 0.5-2;

(2) the layered double hydroxides of intercalation structure is calcined for 0.5-3 hours in an inert atmosphere or a reducing atmosphere to give a calcined product, wherein the inert atmosphere is nitrogen gas or argon gas, the reducing atmosphere is hydrogen gas, and the calcination temperature is 600-800° C.;

(3) the calcined product is placed in a nitric acid solution with the solid-liquid ratio of 2-5 g/L and subjected to the ultrasonic treatment for 0.5-2 hours, the solution is removed by using centrifugal separation, and then a precipitate obtained by centrifugal separation is washed with deionized water to obtain a filtrate having a pH of 6.5-7 and is dried at 50-60° C. for 6-12 hours to obtain the carbon nanoring.

2. The method according to claim 1, wherein the soluble salt of the divalent metal ion $M^{2+}$ is one or more of nitrate, sulfate, oxalate and chloride of Mg, Fe, Co, Ni, Cu and Zn; the soluble salt of the trivalent metal ion $M'^{3+}$ is one or more of nitrate, sulfate, oxalate and chloride of Al, Fe and Co.

3. The method according to claim 1, wherein, at least one of the divalent metal ion $M^{2+}$ and the trivalent metal ion $M'^{3+}$ is a metal element having the catalytic activity; the metal element having the catalytic activity is Fe, Co, and Ni.

4. The method according to claim 2, wherein, at least one of the divalent metal ion $M^{2+}$ and the trivalent metal ion $M'^{3+}$ is a metal element having the catalytic activity; the metal element having the catalytic activity is Fe, Co, and Ni.

5. The method according to claim 1, wherein the molar ratio of the divalent metal ion $M^{2+}$ to the trivalent metal ion $M'^{3+}$ is 2-4:1.

6. The method according to claim 1, wherein the total concentration of the divalent metal ion $M^{2+}$ and the trivalent metal ion $M'^{3+}$ is 0.2-0.5 mol/L in the mixed-salt solution.

7. The method according to claim 1, wherein the soluble salt of the long-chain alkyl anion $A^-$ is one or more of sodium dodecylsulfate, sodium dodecylsulfonate, sodium dodecylbenzenesulfonate, potassium dodecylsulfate, potassium dodecylsulfonate, and potassium dodecylbenzenesulfonate.

8. The method according to claim 1, wherein the long-chain alkyl anion $A^-$ has the same number of moles as that of the trivalent metal ion $M'^{3+}$ in the mixed-salt solution.

9. The method according to claim 1, wherein the carbon source molecule C is one or more of methyl methacrylate, n-pentane, benzene, toluene, xylene, and styrene.

10. The method according to claim 1, wherein the carbon source molecule C has the number of moles being 1.2-12 times of the number of moles of the trivalent metal ion $M'^{3+}$ in the mixed-salt solution.

11. The method according to claim 1, wherein in the step (1), the alkaline solution is a solution with the concentration of 2-5 mol/L prepared by dissolving sodium hydroxide or potassium hydroxide in deionized water removed of carbon dioxide.

12. The method according to claim 1, wherein the number of moles of the alkali in the alkaline solution is 2 times of the total number of moles of the divalent metal ion $M^{2+}$ and the trivalent metal ion $M'^{3+}$.

13. The method according to claim 11, wherein the number of moles of the alkali in the alkaline solution is 2 times of the total number of moles of the divalent metal ion $M^{2+}$ and the trivalent metal ion $M'^{3+}$.

14. The method according to claim 1, wherein in the step (3), the concentration of the nitric acid solution is 10-30% by mass.

15. The method according to claim 1, wherein in the step (3), the centrifugal separation is carried out for 1 to 10 minutes at the rotation speed of 3000-9000 revolutions/min.

* * * * *